(12) United States Patent
Conlee et al.

(10) Patent No.: US 6,758,493 B2
(45) Date of Patent: Jul. 6, 2004

(54) PASSENGER SIDE ACTIVE KNEE BOLSTER

(75) Inventors: James Kent Conlee, Dayton, OH (US); Bassam Georges Khoudari, Shelby Township, MI (US); Carl Dennis Williams, Centerville, OH (US); Steven Aurel Damian, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 96 days.

(21) Appl. No.: 10/137,563

(22) Filed: May 2, 2002

(65) Prior Publication Data

US 2002/0125691 A1 Sep. 12, 2002

Related U.S. Application Data

(63) Continuation-in-part of application No. 09/829,445, filed on Apr. 9, 2001, now abandoned, which is a division of application No. 09/479,166, filed on Jan. 7, 2000, now Pat. No. 6,213,497, which is a continuation-in-part of application No. 09/130,939, filed on Aug. 7, 1998, now Pat. No. 6,032,978.

(51) Int. Cl.$^7$ ............................................. B60R 21/045
(52) U.S. Cl. ....................... 280/753; 224/280; 224/282
(58) Field of Search ................................ 280/753, 730.1, 280/751, 730.2, 743.1; 224/280, 281, 282

(56) References Cited

U.S. PATENT DOCUMENTS

| | | | |
|---|---|---|---|
| 3,724,870 A | * 4/1973 | Kurokawa et al. | 280/741 |
| 4,198,075 A | 4/1980 | Kob et al. | 280/753 |
| 5,312,131 A | 5/1994 | Kitagawa et al. | 280/730.2 |
| 5,324,070 A | 6/1994 | Kitagawa et al. | 280/730.1 |
| 5,382,051 A | 1/1995 | Glance | 280/751 |
| 5,443,285 A | * 8/1995 | Boll | 280/732 |
| 5,476,283 A | 12/1995 | Elton | 280/753 |
| 5,536,043 A | 7/1996 | Lang et al. | 280/753 |
| 5,544,913 A | * 8/1996 | Yamanishi et al. | 280/730.2 |
| 5,570,901 A | 11/1996 | Eyrainer | 200/730.1 |
| 5,716,093 A | 2/1998 | Sadr | 296/146.6 |
| 5,775,729 A | 7/1998 | Schneider et al. | 280/730.1 |
| 5,803,486 A | 9/1998 | Spencer et al. | 280/728.2 |
| 5,816,613 A | 10/1998 | Specht et al. | 280/753 |
| 5,931,493 A | 8/1999 | Sutherland | 280/730.1 |
| 6,039,380 A | * 3/2000 | Heilig et al. | 280/753 |
| 6,213,497 B1 | 4/2001 | Spencer et al. | |
| 6,615,914 B1 | 9/2003 | Young | 280/743.1 |
| 6,619,689 B2 | 9/2003 | Spencer et al. | |

FOREIGN PATENT DOCUMENTS

| | | |
|---|---|---|
| DE | 3934588 | 4/1991 |
| DE | 195 46 143 | 6/1997 |

* cited by examiner

Primary Examiner—Eric Culbreth
(74) Attorney, Agent, or Firm—Scott A. McBain

(57) ABSTRACT

An automotive glove box assembly. The glove box assembly includes a storage bin and a door disposed in hinging relation to the storage bin. The door includes an expansible body having a face portion facing towards a vehicle occupant and a back portion in opposing relation to the face portion. The expansible body is operatively connected to at least one gas emitting unit such that upon discharge of gas from the gas emitting unit, the expansible body is pressurized and the face portion is projected outwardly to an extended position so as to intercept lower extremities of the occupant.

21 Claims, 12 Drawing Sheets

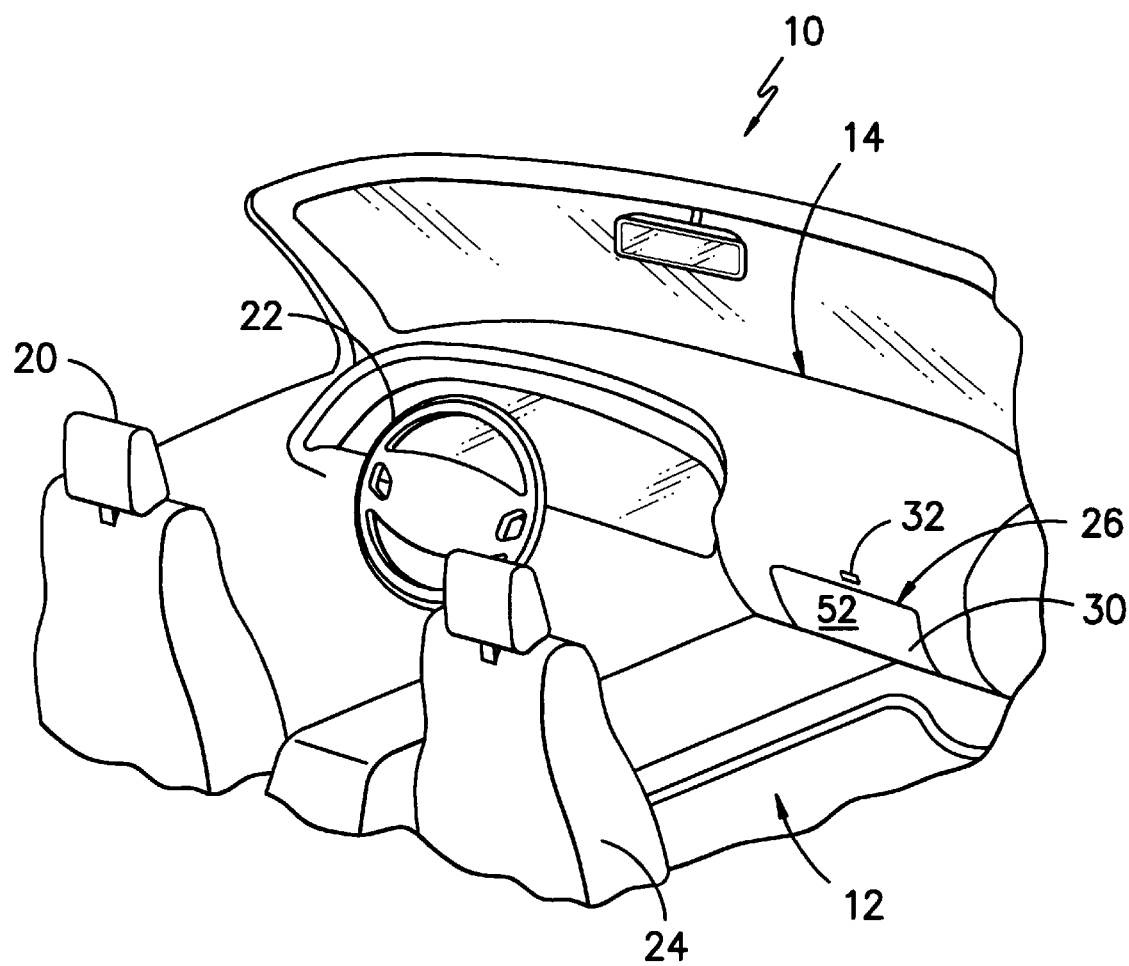
FIG. —1—

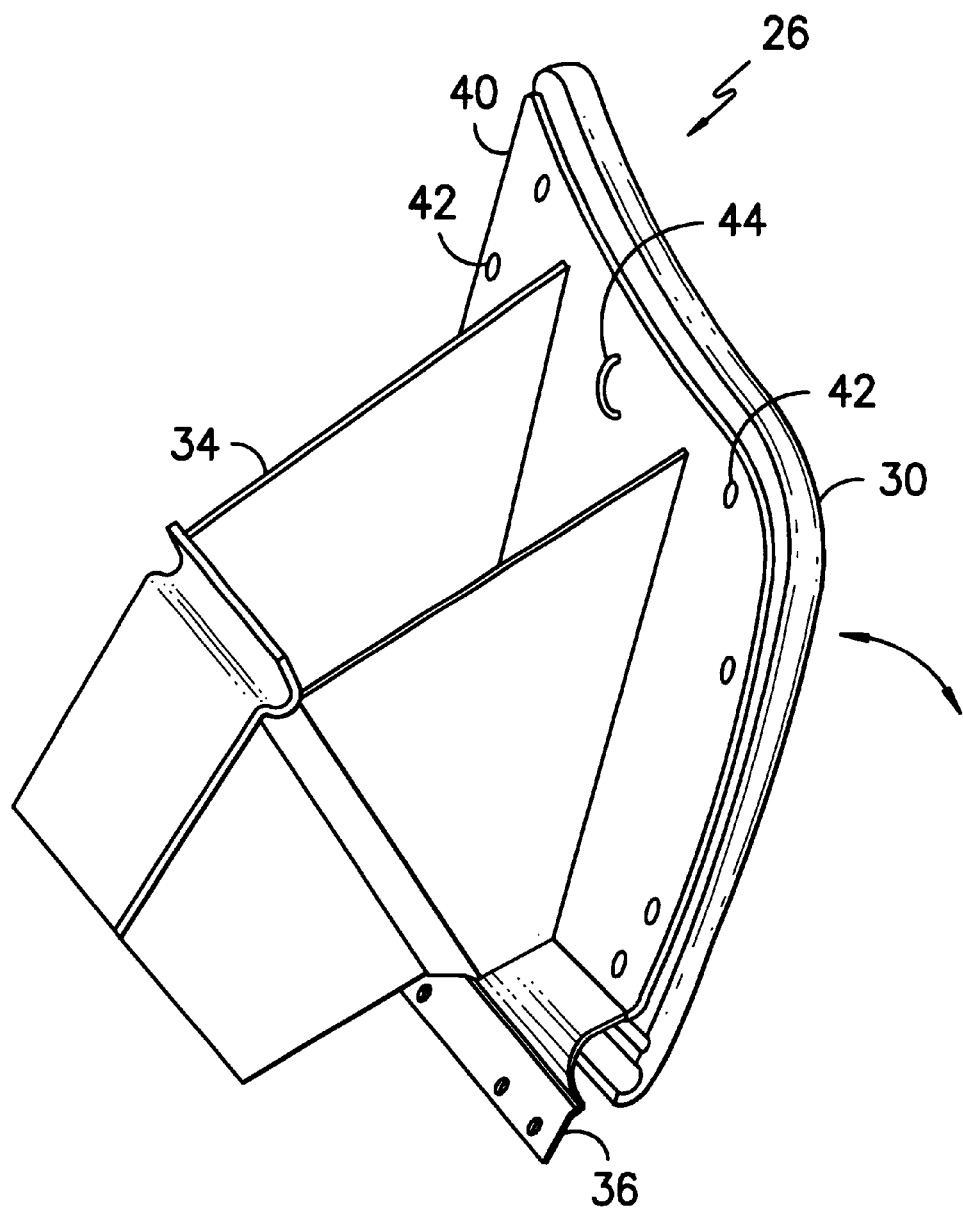
FIG. −2−

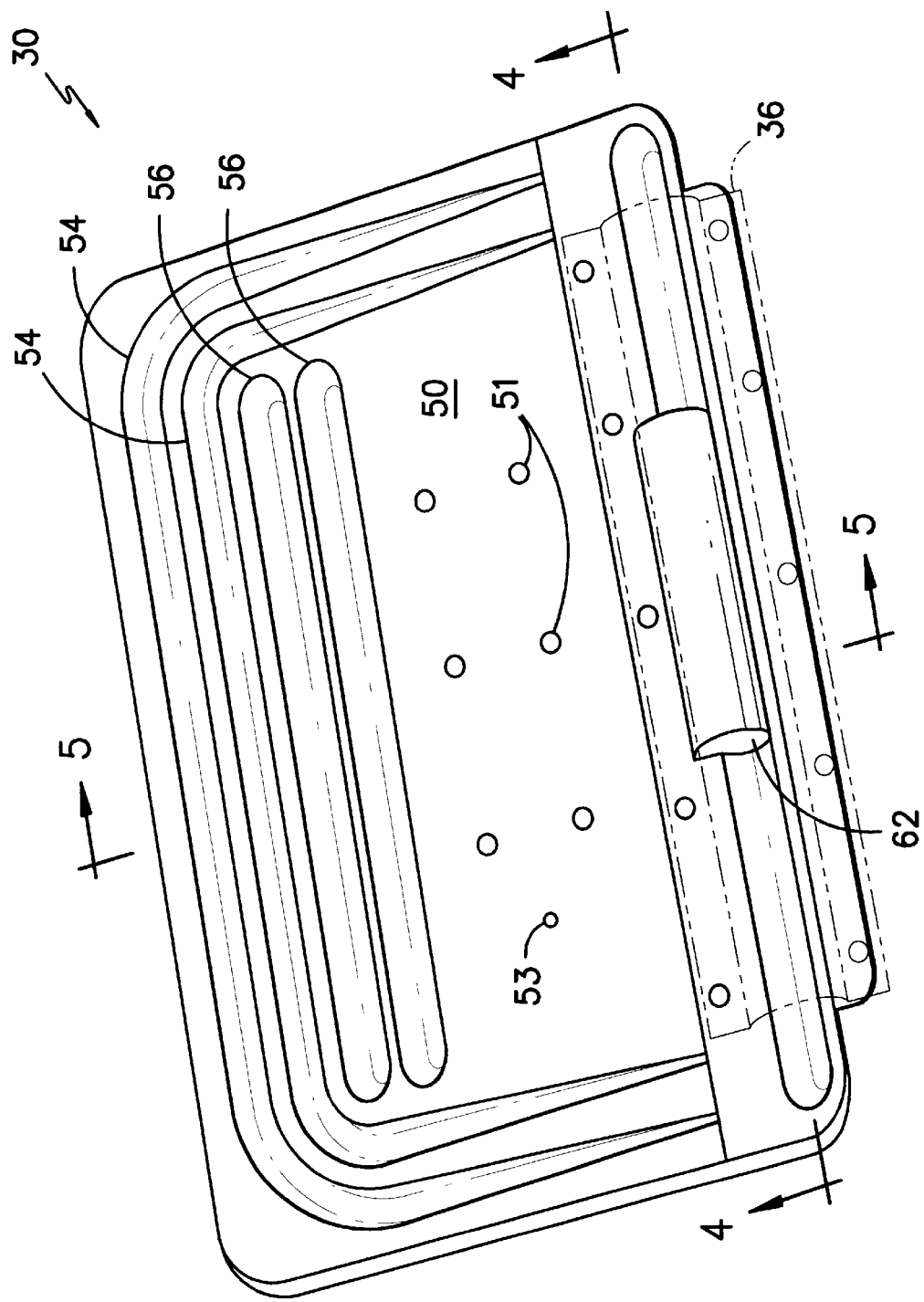
FIG. -3-

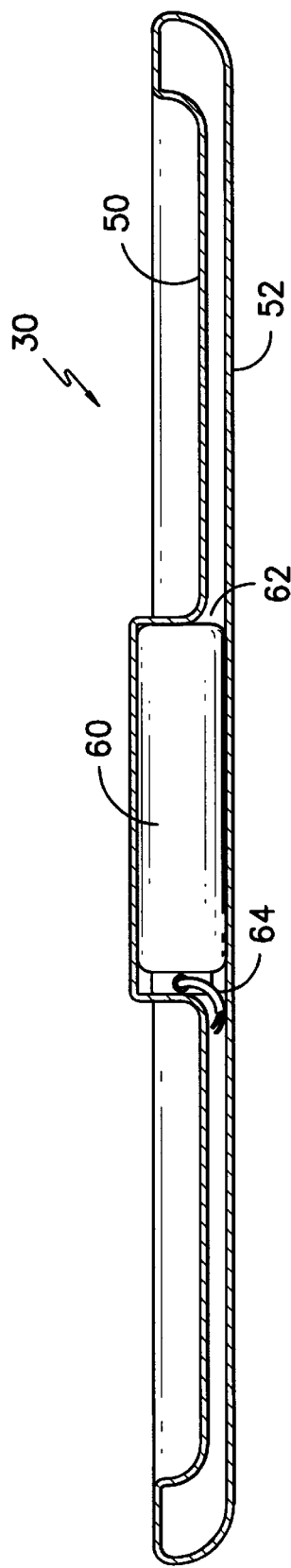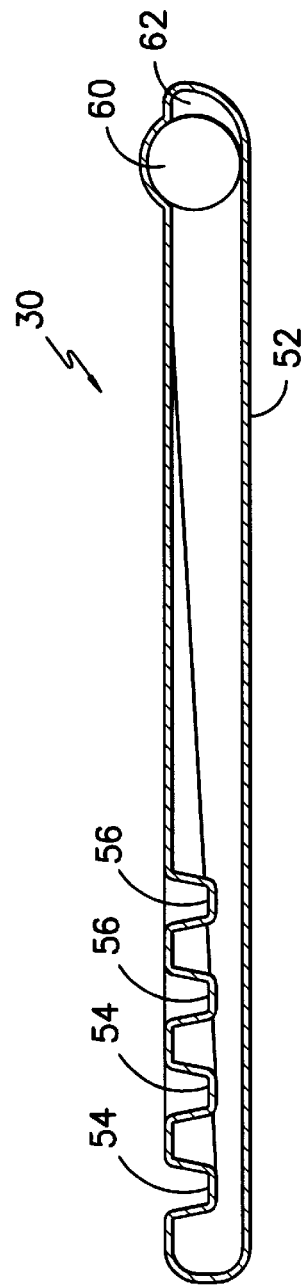

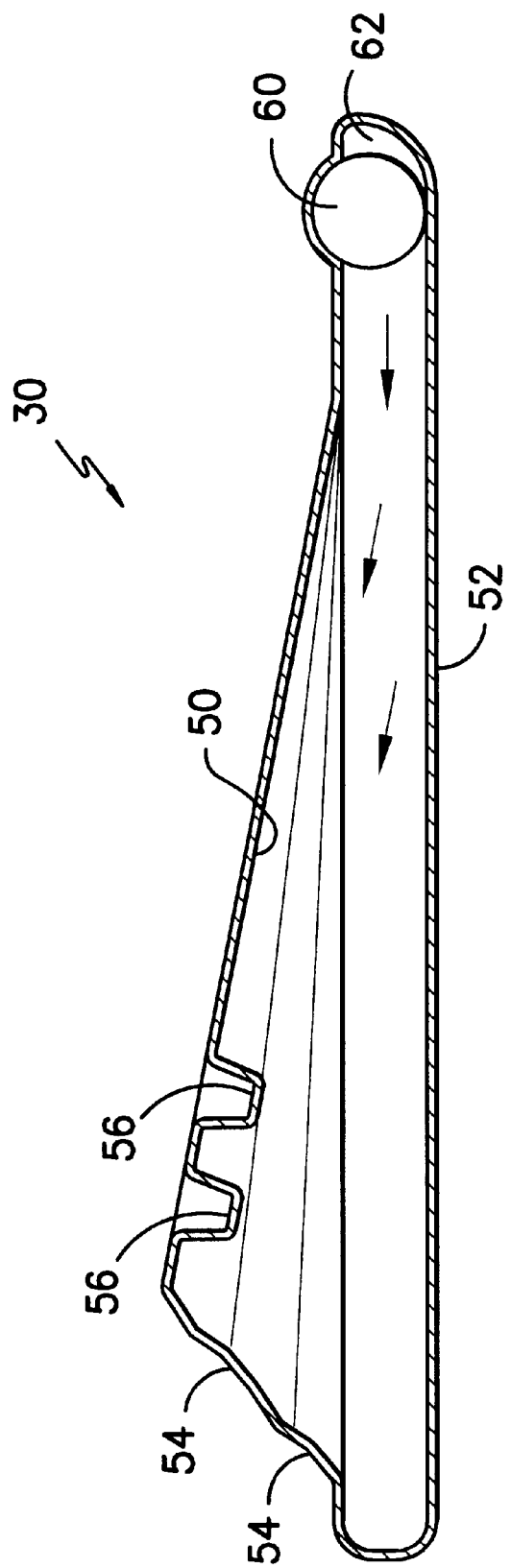
FIG. -6-

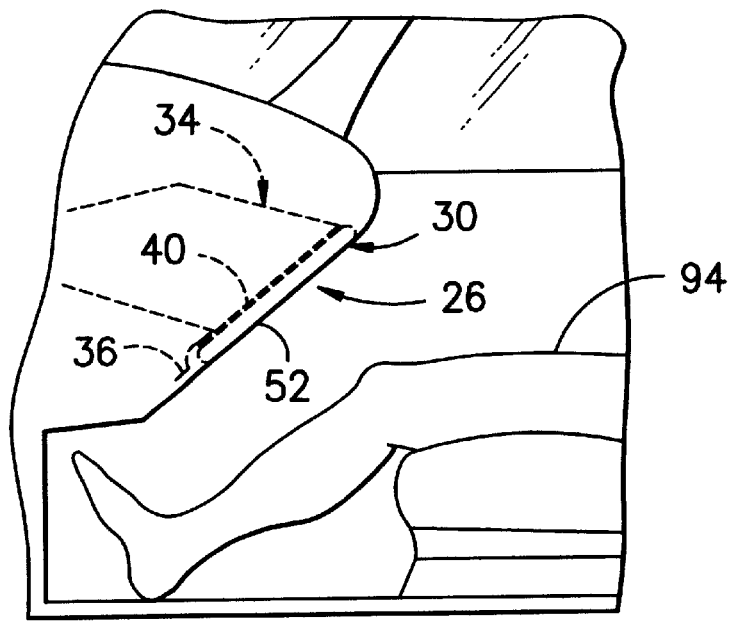
FIG. -7-
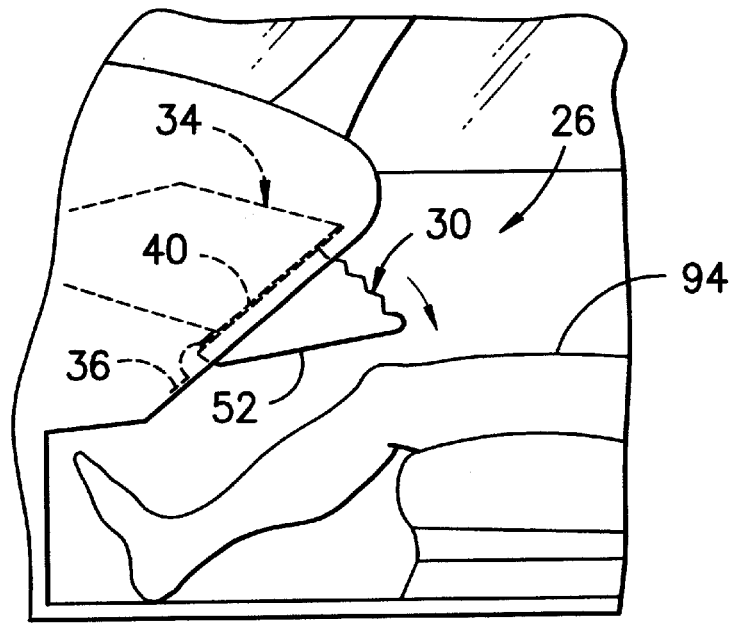
FIG. -8-

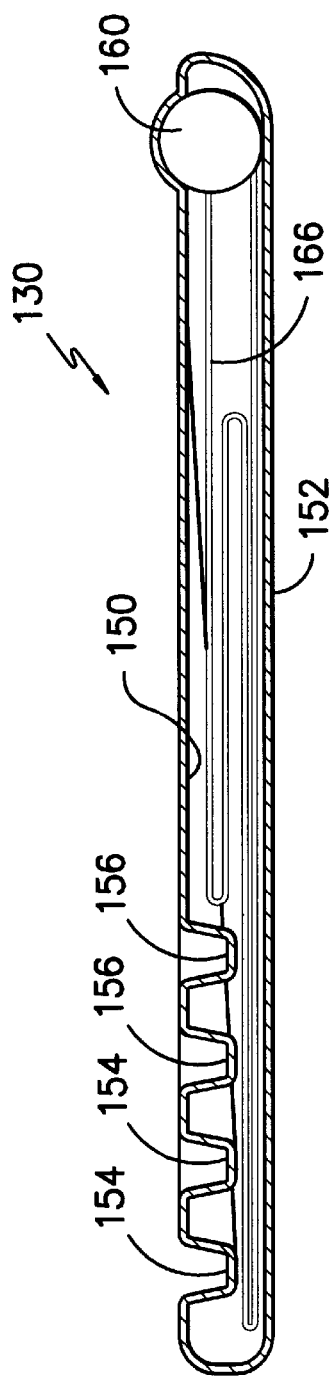
FIG. -9-
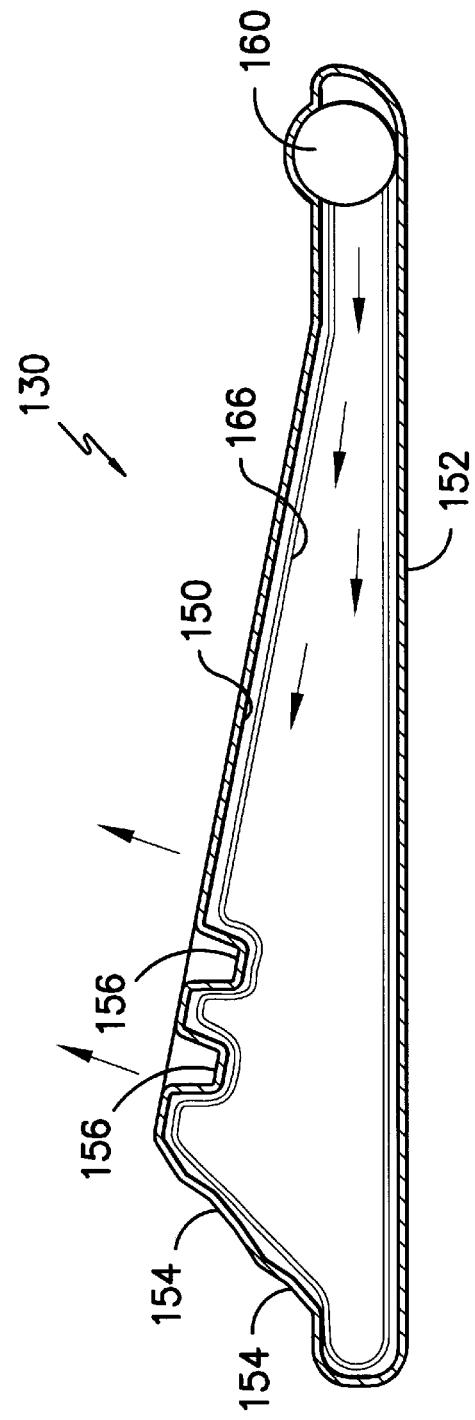
FIG. -10-

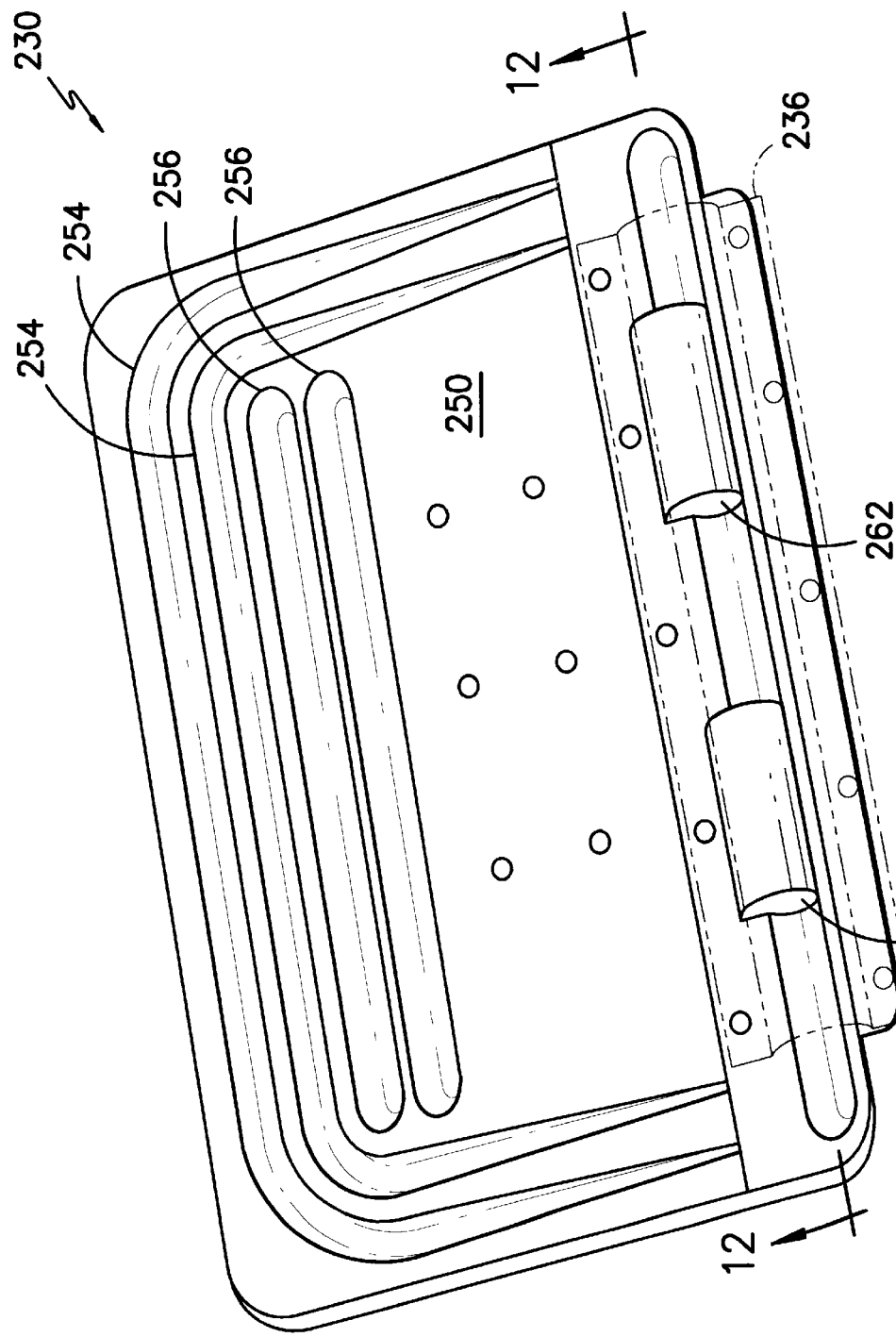

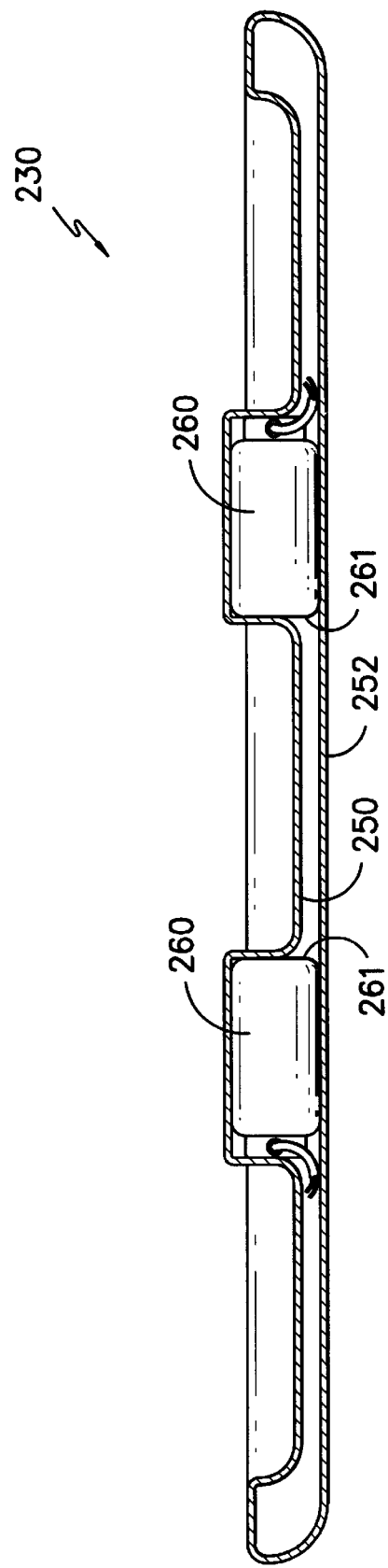
FIG. -12-

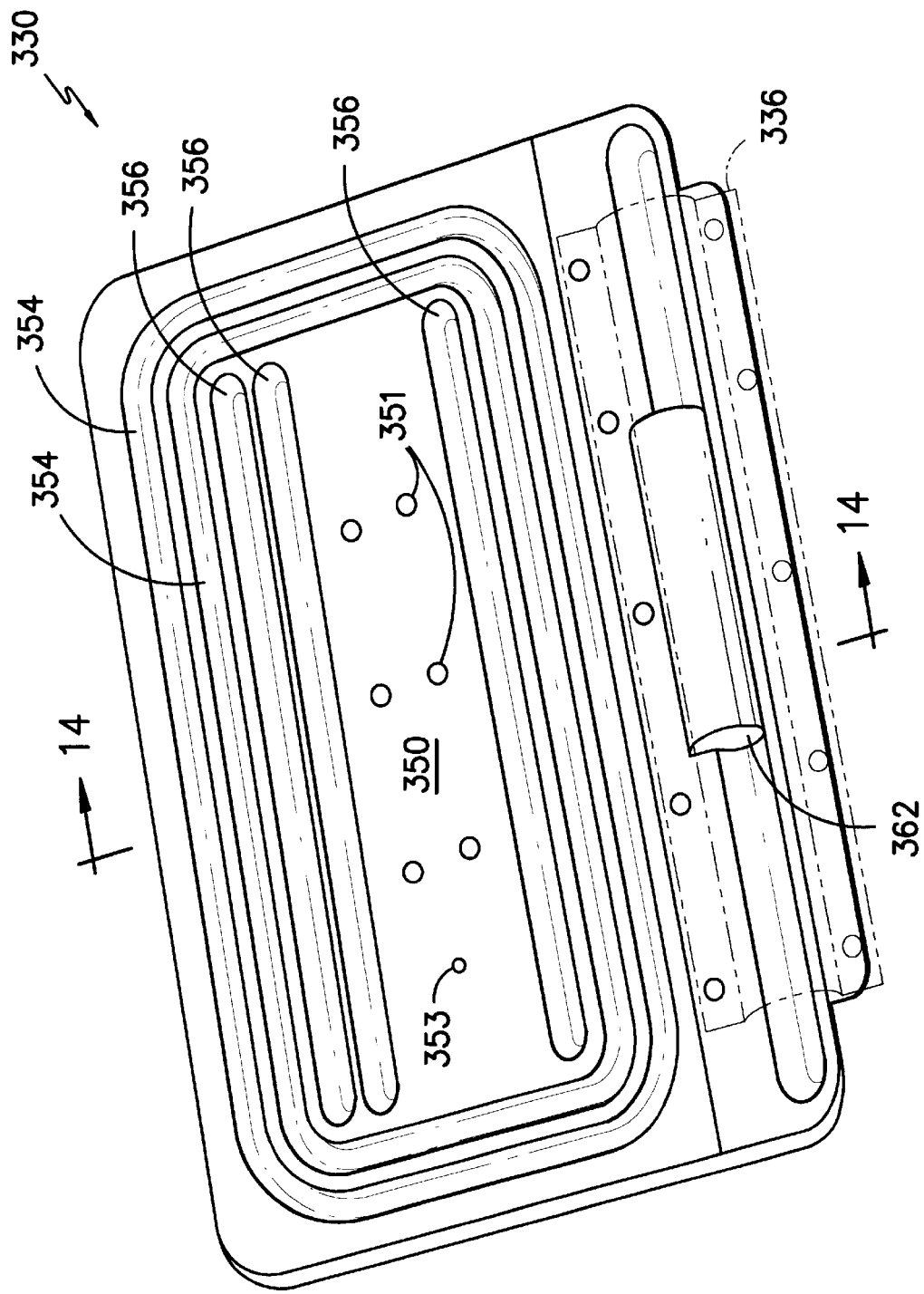

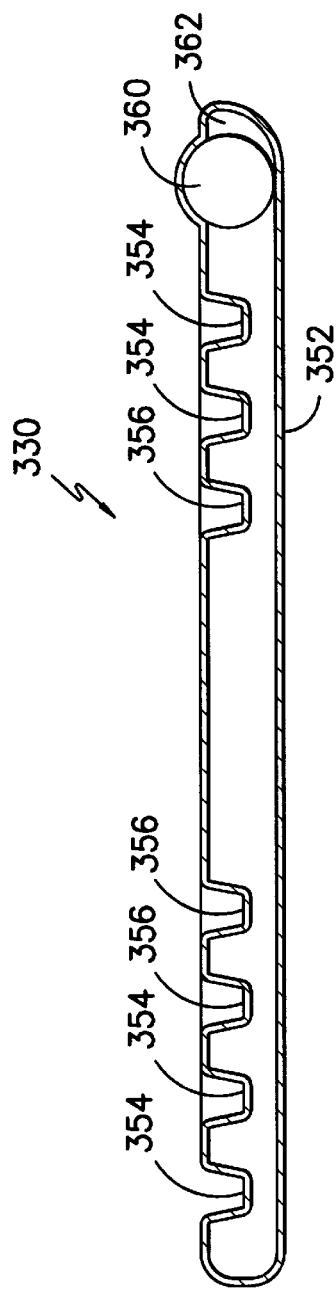
FIG. -14-
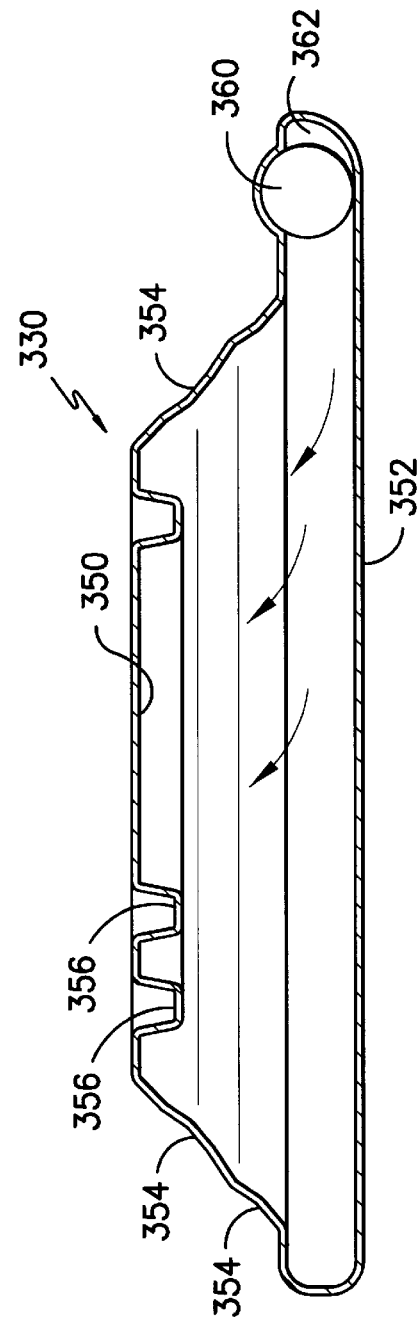
FIG. -15-

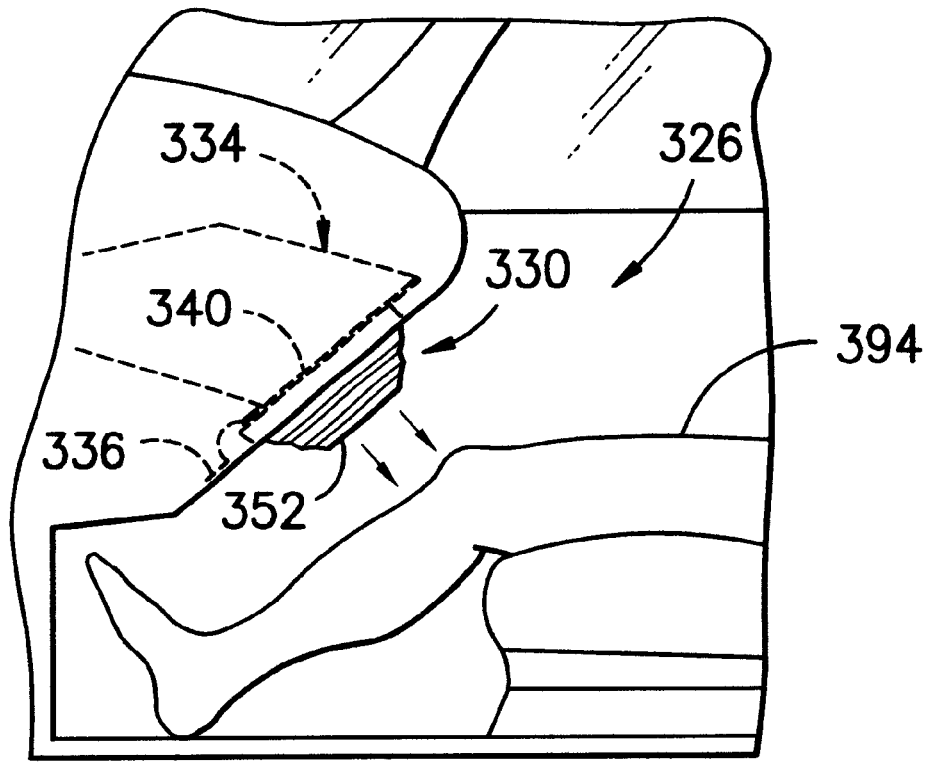
FIG. -16-

PASSENGER SIDE ACTIVE KNEE BOLSTER

CROSS-REFERENCE TO RELATED APPLICATION

This is a continuation-in-part of U.S. application Ser. No. 09/829,445 having a filing date of Apr. 9, 2001, abandoned, which is a division of application Ser. No. 09/479,166 filed Jan. 7, 2000 (now U.S. Pat. No. 6,213,497) which is a continuation-in-part of application Ser. No. 09/130,939 filed Aug. 7, 1998 (now U.S. Pat. No. 6,032,978) all of which are incorporated by reference herein.

TECHNICAL FIELD

This invention relates generally to inflatable vehicle protective devices and, more particularly, to an inflatable knee bolster incorporated within an operable glove box door at a passenger side of a transportation vehicle.

BACKGROUND OF THE INVENTION

Inflatable knee bolsters have been developed to enhance vehicle occupant protection in the event of sudden vehicle deceleration. Such devices increase the duration of deceleration of an occupant's femurs and serve to control upper torso kinematics during a frontal impact event. In operation the bolster impact surface is moved from a stored position to an extended position so as to intercept an occupant's knees early in the impact event. This allows the knees more time to decelerate to the vehicle's final velocity. The initial positioning of the bolster impact surface in a retracted stored position allows more styling flexibility and enhances occupant entry and egress from the vehicle during day to day use.

One prior inflatable knee bolster construction has utilized an inflatable air bag sandwiched between an impact surface and a reaction surface. When a gas generating inflator is triggered, the air bag expands so as to move the impact surface a predetermined distance to an active position. This position may be controlled by tethers extending between the impact surface and the reaction surface. While such a construction may provide a desired degree of protection, past constructions have been relatively complex and may require a substantial amount of space within the vehicle. The space requirements for mounting the bolster apparatus may be particularly problematic on the passenger side of the vehicle where little room may exist under the dash panel.

It would be desirable to provide a simple inflatable knee bolster which is suitable for disposition in front of a vehicle occupant seated on the passenger side of the vehicle in a substantially unobtrusive manner so as to promote substantial freedom in the design of the vehicle interior.

SUMMARY OF THE INVENTION

The present invention provides advantages and alternatives over prior knee bolster installations by providing an inflatable knee bolster which may be incorporated within an operable hinging door for a glove box disposed in opposing relation to a vehicle passenger. Heretofore, inflatable knee bolsters on a passenger side of a vehicle have been located at positions generally below the glove box in a separate installation. An independent glove box door was nonetheless used to open and close a glove box opening. The present invention offers the benefit of providing both the traditional opening and closing function of the glove box door as well as the inflatable protective function of a knee bolster within a single unit. This combined function provides substantial additional flexibility in the design of an aesthetically pleasing vehicle interior without sacrificing occupant protection.

Additional features and advantages of the invention will be set forth in part in the description which follows, and in part will be obvious from the description. While the invention will be described in connection with certain illustrated embodiments, constructions and procedures, it is to be understood that such embodiments, constructions and procedures are exemplary and explanatory only and are in no way to be construed as restrictive of the invention. On the contrary it is the intent of the applicants to cover all alternatives, modifications, and equivalents as may be included within the true spirit and scope of the invention.

BRIEF DESCRIPTION OF THE DRAWINGS

The present invention will now be described, by way of example only, with reference to the accompanying drawings which constitute a part of this specification and in which:

FIG. 1 is a perspective view of a vehicle interior;

FIG. 2 is a rear perspective view of a glove box unit and associated hinged displaceable door for incorporation within an automotive vehicle;

FIG. 3 is a rear elevation view of a glove box door incorporating a pattern of inflatable pleats for expansion upon introduction of an inflation gas;

FIG. 4 is a view taken generally along line 4—4 in FIG. 3 illustrating placement of an elongate gas generating inflator;

FIG. 5 is a view taken generally along line 5—5 in FIG. 3;

FIG. 6 is a view similar to FIG. 5 illustrating expansion of the door structure upon introduction of an inflation gas;

FIG. 7 illustrates the placement of the inflatable door prior to inflation;

FIG. 8 illustrates the inflatable door of FIG. 3 in an activated position following inflation;

FIG. 9 is a view similar to FIG. 5 illustrating an exemplary embodiment incorporating an inflatable air bag cushion within the displaceable door structure prior to activation;

FIG. 10 illustrates the displaceable door structure of FIG. 9 following introduction of an inflation gas;

FIG. 11 is a view similar to FIG. 3 illustrating an alternative arrangement for an inflatable door structure adapted to accept a plurality of discrete small inflators;

FIG. 12 is a view taken generally along line 12—12 in FIG. 11 illustrating a plurality of discrete small inflators in the door structure of FIG. 11;

FIG. 13 is a view similar to FIG. 3 illustrating an alternative construction for a glove box door;

FIG. 14 is a view taken generally along line 14—14 in FIG. 13;

FIG. 15 is a view similar to FIG. 14 illustrating expansion of the door structure upon introduction of an inflation gas; and FIG. 16 illustrates operational expansion of the glove box door in FIGS. 13–16 upon introduction of an inflation gas.

While the invention has been illustrated and generally described above and will hereinafter be described in connection with certain potentially preferred embodiments, constructions and practices, it is to be understood that in no event is the invention to be limited to such illustrated and described embodiments constructions and practices. On the contrary, it is intended that the present invention shall extend to all alternatives and modifications as may embrace the principles of this invention within the true spirit and scope thereof.

DESCRIPTION OF THE PREFERRED EMBODIMENT

Reference will now be made the various figures wherein to the extent possible like reference numerals have been utilized to designate like components throughout the various views. In FIG. 1 a vehicle 10 such as an automotive transportation vehicle or the like is illustrated. As shown, the vehicle 10 includes an interior 12 incorporating a dash panel 14 of contoured construction. A driver side seat 20 is disposed in substantially opposing relation to a steering wheel 22 on one side of the vehicle 10. A passenger seat 24 is located on the other side of the vehicle 10 in opposing relation to a glove box 26 disposed within the dash panel 14. As shown, the glove box 26 includes a door portion 30 which may be opened by a remote latch release 32 as will be well known to those of skill in the art.

As best illustrated in FIG. 2, the glove box assembly 26 includes a door portion 30 and a bin portion 34 extending away from the door portion 30 for disposition at the interior of the dash panel 14. As illustrated, a hinge structure 36 such as a living hinge or the like extends away from the lower edge of the door portion 30 so as to permit the rotation of the door portion 30 away from the dash panel 14 when the door portion is opened. It is contemplated that the hinge structure 36 may be either integral with the door portion 30 or may be formed as a separate unit and thereafter attached in operative relation to the door portion 30. In the event that the hinge structure 36 is of a living hinge construction, it is contemplated that the hinge structure 36 may be formed of a generally pliable material suitable for use in a large number of opening cycles. By way of example only, and not limitation, in such a construction it is contemplated that a flexible polymeric material such as olefinic polypropylene or the like may be used to form the hinge structure 36. Of course it is to be understood that the hinge structure 36 may take on virtually any other construction and material as may be desired including by way of example only, a piano hinge or the like of metal, or plastic.

According to the illustrated exemplary embodiment, a relatively rigid backing plate 40 is located across the surface of the door portion 30 in opposing relation to the bin portion 34. It is contemplated that the backing plate 40 may be formed of a relatively rigid plastic or other material such as metal or the like adjoined to the door portion 30 by attachment elements 42 such as spot welds, screw fasteners or the like. In this construction the backing plate 40 provides a reaction surface for the projected outward expansion of the door portion upon the introduction of an inflation gas in a manner to be described further hereinafter.

In the illustrated embodiment the backing plate 40 includes a hasp member 44 projecting away from the backing plate 40 and towards the bin portion 34. The hasp member 44 may engage a cooperating latching element (not shown) disposed at the interior of the dash panel 14 which is opened and closed in a camming action by the latch release 32 to thereby hold the door portion 30 in place in a manner as with conventional glove box door configurations as will be well known to those of skill in the art. Accordingly, it is to be understood that the present invention is in no way limited to any particular latching arrangement and may use any of such latching arrangement as may be known to those of skill in the art.

Referring now to FIGS. 3–5, the inflatable door portion 30 may be a unitary hollow structure formed of a molded thermoplastic polymeric material. Such a thermoplastic polymeric material may include TPO (thermoplastic polyolefin) materials including by way of example only thermoplastic polypropylene, thermoplastic polyethylene, thermoplastic polybutene, thermoplastic polyisoprene and their copolymers. Thermoplastic vulcanized rubber or the like may also be used. One potentially preferred material is a TPO composition believed to be available under the trade designation SALFLEX-245 from ABC Group Interior Systems of Etobicoke, Canada. It is contemplated that the use of moldable thermoplastic materials may facilitate the use of potentially desirable molding practices such as injection molding, blow molding, rotational or centrifugal molding, slush molding and the like as may be used to form the door portion 30.

The inflatable door portion 30 may include an inner wall 50 facing into the dash panel 14 when the door portion 30 is in a closed position and a spaced front or outer wall 52 normally facing into the interior 12 of the vehicle 10. If desired, a multiplicity of weld points 51 may be present across an interior portion of the inner wall 50 for point bonding to the backing plate 40. One or more vent holes 53 may also be present to expel inflation gas as impact with an occupant takes place.

It is contemplated that the materials forming the inner wall 50 and the outer wall 52 may be either the same or different. By way of example only, in the event that the same material is utilized for the inner wall 50 and the outer wall 52, such as in a one piece hollow molded construction, it is contemplated that the outer wall 52 may be thicker than the inner wall 50 so as to promote selective deformation across the inner wall 50 while nonetheless avoiding deformation of the outer wall. By way of further example, in the event that different materials are utilized to form the inner wall 50 and the outer wall 52, it is contemplated that the material forming the outer wall 52 may be more rigid than the material forming the inner wall 50 thereby promoting selective deformation of the inner wall while nonetheless avoiding deformation of the outer wall. It is contemplated that this increased rigidity may be achieved by the outer wall 52 being of enhanced thickness relative to the inner wall. It is also contemplated that the polymeric materials may be of differing durometers wherein the polymeric material forming the outer wall has a higher durometer than the polymeric material forming the inner wall. In the event that materials of different durometers are utilized, it is contemplated that the inner and outer walls may be of either the same or different thickness. In the event that different materials are to be used, it is contemplated that the inner wall 50 and the outer wall 52 may be formed separately such as by injection molding or the like and thereafter joined together.

In the event that the inner wall 50 and outer wall 52 are to be formed separately from one another and thereafter joined together, it is contemplated that such joinder may be effected by adhesively bonding or welding perimeter edges of the inner and outer wall together. By way of example only, and not limitation, it is contemplated that the joining operation may be carried out using polymeric welding techniques including sonic welding, vibration welding and RF (i.e. radio frequency) welding. As will be appreciated, the separate formation and subsequent joining of the inner wall 50 and the outer wall 52 may be particularly useful in the event that different materials are used to form the inner wall 50 and the outer wall 52. However, such formation practices may also be used if the materials are formed from the same material.

As best illustrated in FIG. 3, it is contemplated that a plurality of depressed pleat elements 54 may extend at least partially along the sides and across the top of the door portion 30. As shown, the pleat elements 54 project away from the inner wall 50 and towards the outer wall 52. In the illustrated exemplary embodiment, the pleat elements 42 have a progressively diminishing width and depth as they extend along the sides of the door portion 30 from the upper edge to the lower corners. Upon introduction of an inflation gas the depressed pleat elements 54 define deformable force concentrating surfaces which may collapse away from the outer wall as gas pressure is introduced. The arrangement illustrated wherein the surface area of the pleat elements 42 progressively diminishes from the upper corners to the lower corners provides preferential expansion along the upper edge thereby facilitating a generally fan-like expansion with deformation being greatest along the upper edge. Such expansion characteristics may be desirable in some instances.

As illustrated, in the exemplary embodiment one or more depressed rib elements 56 may be disposed in spaced relation across the inner wall at an interior portion of the door 30. The discrete rib elements 56 may undergo some degree of deformation during expansion, but will normally provide a stabilizing effect to the interior of the inner wall 50 due to their isolated location. Thus, as best illustrated in FIG. 6, upon introduction of inflation gas into the door portion 30 the pleat elements 54 collapse away from the outer wall 52 while the discrete rib elements 56 provide a stabilizing effect across the inner wall 50 thereby promoting a controlled outward projection of the outer wall 52. That is, since the inner wall 50 is blocked against movement, the outer wall 52 is forced outwardly.

Inflation of the door portion 30 may be effected by use of an inflator 60 housed within a chamber 62 molded into the door portion 30. The inflator 60 may be of a type such as is used in inflation of side air bags and the like as will be well know to those of skill in the art. One such inflator is illustrated and described in U.S. Pat. No 5,803,486 to Spencer et al. the teachings of which are incorporated by reference as in fully set forth herein. As will be appreciated, the inflator 60 is activated by a signal received through a lead 64 in response to measurement of a predetermined vehicle condition by a sensor such as an impact sensor or sensor measuring vehicle deceleration as will be known to those of skill in the art.

As illustrated through reference to FIGS. 7 and 8, prior to activation of the inflator the door portion 30 has a shallow profile configuration held in place in closing relation to the dash panel 14. However, upon activation of the inflator, the door portion 30 undergoes an expansive deformation acting in reaction against the backing plate 40 or other locking arrangement such as a frame surrounding the bin portion 34. In order to relieve the expansive deformation of the pleat elements 54, the front or outer wall 52 is thrust forward towards the legs 94 of an occupant to be protected. Preferably, during this expansion, the door portion 30 remains in a substantially latched position relative to the dash panel 14 so as to provide a backing support.

It is to be appreciated that the present invention may be the subject of a number of variations. By way of example only and not limitation, one such alternative construction is illustrated in FIGS. 9 and 10 which correspond generally to FIGS. 5 and 6. In the alternative embodiment illustrated in FIGS. 9 and 10 components corresponding to those previously illustrated and described are designated by like reference numerals increased by 100. As illustrated, the door portion 130 houses an inflatable bag element 166 in fluid communication with the inflator 160. In operation as inflation gas enters the bag element 166, the bag element exerts pressure across the interior of the door portion 130 thereby causing the expansible deformation of the pleat elements 154 in the manner as previously described in embodiments incorporating no bag element.

The presence of the bag element 166 may be desired in some configurations wherein the door portion 130 has a degree of permeability which prevents efficient inflation. In the event that a bag element 166 is utilized, it is contemplated that such an element may be formed of any suitable material although a relatively lightweight textile or polymeric film may be preferred. As will be appreciated, the bag element 166 need not have a high degree of internal strength due to the fact that it is supported by the body of the door portion 30 during the inflation event.

Still another alternative embodiment for the door portion is illustrated in FIGS. 11 and 12 wherein elements corresponding to those previously illustrated and described are designated by corresponding reference numerals increased by 200. As illustrated, in this embodiment chambers 262 are provided for several small gas generating elements 260 (FIG. 12) which are also known as micro-gas generators. It is contemplated that the use of several small gas generating elements 260 may permit additional styling flexibility by reducing the need to accommodate a single large hybrid inflator or other type of inflator. Moreover, it has been determined that by using such a construction utilizing a plurality of relatively small gas generating elements that the traditional inflator may be replaced by nontraditional gas generating elements. By way of example only, and not limitation, it has been found that suitable gas generating elements 260 may be in form of pyrotechnic squib elements as will be known to those of skill in the art. As will be appreciated, in inflatable air bag systems such pyrotechnic squib elements have been used previously to apply an initiating force to a traditional inflator through the generation of a relatively low volume of high temperature, high pressure gas. This initiating force thereafter activates the generation and discharge of much larger quantities of inflation gas from the associated inflator. Surprisingly, it has been found that the gas generation from such pyrotechnic squibs is sufficient to provide the required deformation within the door portion 230 thereby avoiding the need for a large extended inflator. As shown, in the illustrated embodiment the gas generating elements 260 in the form of pyrotechnic squibs need not be attached to any additional inflator. That is, the squibs alone may serve to provide all necessary inflation gas rather than being used in their traditional role to activate gas generating chemical compositions within an additional inflation device. Of course, it is to be appreciated that while two such gas generating elements 260 have been illustrated any greater or lesser number may likewise be utilized if desired.

According to the arrangement illustrated in FIGS. 11 and 12 the gas generating elements 260 are arranged with gas discharge ends 261 facing in opposing relation to one another inwardly towards the longitudinal centerline of the door portion 230. However, it is to be understood that this arrangement is exemplary only and that if desired one or more of the gas generating elements 260 may be positioned so as to have its gas discharge end 261 face towards the upper edge of the door portion directly into the hollow chamber between the inner wall 250 and the outer wall 252. Likewise, it is contemplated that the gas generating elements 260 may be located a positions other than across the lower edge of the door portion 230 such as along the sides or at the interior.

Still another contemplated construction for an inflatable glove box door is illustrated in FIGS. 13–16 wherein elements corresponding to those previously illustrated and described are designated by corresponding reference numerals increased by 300. As illustrated, in this embodiment the deformable pleat elements 354 extend in substantially framing relation around an interior. This framing arrangement is intended to facilitate a more uniform outward projection of the outer wall 352 away from the inner wall 350. In this arrangement stability is maintained across the framed interior by the presence of a multiplicity of discrete stabilizing ribs 356 located inboard of the deformable pleat elements 354. While a pair of stabilizing ribs 356 is illustrated as being present adjacent the pleat elements along the upper edge and a single stabilizing rib is illustrated as being present adjacent the pleat elements along the lower edge, it is to be understood that this is exemplary only and that any other arrangement as may be desired may likewise be utilized. Likewise, while a single elongate inflator 360 housed within a storage location 362 is illustrated in FIGS. 13–16, a multiplicity of discrete small inflators may also be utilized.

The deployment characteristics arising from the framing arrangement of deformable pleat elements 354 is shown in FIG. 16. As illustrated, such a framing arrangement results in a more uniform projection of the outer wall 352 towards the lower extremities 394 of the person to be protected rather than the fan-like opening characteristics previously illustrated and described in relation to FIG. 8. It is believed that such a substantially uniform outward projection may be desirable in some automotive designs.

It is to be understood that while the present invention has been illustrated and described in relation to certain exemplary embodiments, constructions, and procedures, that such embodiments, constructions, and procedures are illustrative only and that the present invention is in no event to be limited thereto. Rather, it is contemplated that modifications and variations embodying the principles of this invention will no doubt occur to those of skill in the art. It is therefore contemplated and intended that the present invention shall extend to all such modifications and variations as may incorporate the broad aspects of the invention within the full spirit and scope thereof as limited only by the appended claims and equivalents thereto.

What is claimed is:

1. An automotive glove box assembly comprising: a storage bin and a hinging door, wherein the door comprises an expansible body including a face portion facing towards a vehicle occupant and a back portion in opposing relation to the face portion and wherein the expansible body is operatively connected to at least one gas emitting unit such that upon discharge of gas from the gas emitting unit, said gas pressurizes the expansible body such that the face portion is projected outwardly to an extended position, wherein the face portion and the back portion are formed from polymeric materials of different durometers and wherein the polymeric material forming the face portion has a greater durometer than the polymeric material forming the back portion.

2. An automotive glove box assembly comprising: a storage bin and a hinging door, wherein the door comprises an expansible body including a face portion facing towards a vehicle occupant and a back portion in opposing relation to the face portion and wherein the expansible body is operatively connected to at least one gas emitting unit such that upon discharge of gas from the gas emitting unit, the gas pressurizes the expansible body and wherein the back portion comprises at least one raised profile element of collapsible construction extending towards the face portion such that upon pressurization of the expansible body, said at least one raised profile element undergoes collapsible deformation thereby expanding the volume of the expansible body and forcing the face portion outwardly to an extended position.

3. The assembly as recited in claim 2, wherein said at least one gas emitting unit comprises a pyrotechnic squib.

4. The assembly as recited in claim 2, wherein the expansible body is operatively connected to a plurality of gas emitting units, wherein at least a portion of said plurality of gas emitting units comprise pyrotechnic squibs.

5. The assembly as recited in claim 2, wherein the expansible body is a unitary hollow structure of molded polymeric material.

6. The assembly as recited in claim 5, wherein said molded polymeric material comprises a thermoplastic polyolefin selected from the group consisting of thermoplastic polypropylene, thermoplastic polyethylene, thermoplastic polybutene, thermoplastic polyisoprene and their copolymers.

7. The assembly as recited in claim 5, wherein the face portion has a thickness greater than the back portion.

8. The assembly as recited in claim 2, wherein the face portion and the back portion are formed from polymeric materials of different durometers.

9. The assembly as recited in claim 8, wherein the polymeric material forming the face portion has a greater durometer than the polymeric material forming the back portion.

10. The assembly as recited in claim 2, further comprising a gas accepting bladder element disposed at the interior of the expansible body.

11. The assembly as recited in claim 2, wherein the back portion comprises a plurality of integrally molded at least partially collapsible profile elements disposed along the sides and across the top of the back portion and wherein at least a portion of the profile elements disposed along the sides of the back portion have a progressively diminishing collapsible surface area, such that the collapsible surface area at upper corners of the expansible body is greater than the collapsible surface area at lower corners of the expansible body.

12. The assembly as recited in claim 2, wherein the back portion comprises at least one integrally molded at least partially collapsible profile element disposed in an extended pattern along the sides and across the top and bottom of the back portion in substantially surrounding relation to an interior area of the back portion such that said at least one collapsible profile element undergoes collapsible deformation on all sides of said interior area upon pressurization.

13. An automotive glove box assembly comprising: a storage bin and a hinging door, wherein the door comprises an expansible body including a face portion facing towards a vehicle occupant and a back portion in opposing relation to the face portion and wherein the expansible body is operatively connected to a plurality of gas emitting pyrotechnic squibs such that upon discharge of gas from the pyrotechnic squibs, the gas pressurizes the expansible body and wherein the back portion comprises at least one raised profile element of collapsible construction extending towards the face portion such that upon pressurization of the expansible body, said at least one raised profile element undergoes collapsible deformation thereby expanding the volume of the expansible body and forcing the face portion outwardly to an extended position.

14. The assembly as recited in claim 13, wherein the expansible body is a unitary hollow structure of molded polymeric material.

15. The assembly as recited in claim 14, wherein said molded polymeric material comprises a thermoplastic polyolefin selected from the group consisting of thermoplastic polypropylene, thermoplastic polyethylene, thermoplastic polybutene, thermoplastic polyisoprene and their copolymers.

16. The assembly as recited in claim 14, wherein the face portion has a thickness greater than the back portion.

17. The assembly as recited in claim 13, wherein the face portion and the back portion are formed from polymeric materials of different durometers.

18. The assembly as recited in claim 17, wherein the polymeric material forming the face portion has a greater durometer than the polymeric material forming the back portion.

19. The assembly as recited in claim 13, further comprising a gas accepting bladder element disposed at the interior of the expansible body.

20. The assembly as recited in claim 13, wherein the back portion comprises a plurality of integrally molded at least partially collapsible profile elements disposed along the sides and across the top of the back portion and wherein at least a portion of the profile elements disposed along the sides of the back portion have a progressively diminishing collapsible surface area, such that the collapsible surface area at upper corners of the expansible body is greater than the collapsible surface area at lower corners of the expansible body.

21. The assembly as recited in claim 13, wherein the back portion comprises at least one integrally molded at least partially collapsible profile element disposed in an extended pattern along the sides and across the top and bottom of the back portion in substantially surrounding relation to an interior area of the back portion such that said at least one collapsible profile element undergoes collapsible deformation on all sides of said interior area upon pressurization.

* * * * *